United States Patent
Latapie et al.

(10) Patent No.: US 12,548,371 B2
(45) Date of Patent: Feb. 10, 2026

(54) BEHAVIORAL GROUP ANALYTICS FOR VIDEO

(71) Applicant: Cisco Technology, Inc., San Jose, CA (US)

(72) Inventors: Hugo Latapie, Long Beach, CA (US); Gaowen Liu, Austin, TX (US); Ozkan Kilic, Long Beach, CA (US); Adam James Lawrence, Pasadena, CA (US); Ramana Rao V.R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 18/107,766

(22) Filed: Feb. 9, 2023

(65) Prior Publication Data

US 2024/0273948 A1    Aug. 15, 2024

(51) Int. Cl.
*G06V 40/20* (2022.01)
*G06T 7/73* (2017.01)
*G06V 10/70* (2022.01)
*G06V 20/40* (2022.01)
*G06V 20/52* (2022.01)
*G06V 40/10* (2022.01)

(52) U.S. Cl.
CPC ............... *G06V 40/20* (2022.01); *G06T 7/73* (2017.01); *G06V 10/70* (2022.01); *G06V 20/41* (2022.01); *G06V 20/46* (2022.01); *G06V 20/52* (2022.01); *G06V 40/10* (2022.01); *G06T 2207/10016* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | |
|---|---|---|
| 8,195,598 B2 | 6/2012 | Hua et al. |
| 8,620,028 B2 | 12/2013 | Eaton et al. |
| 10,887,197 B2 | 1/2021 | Fenoglio et al. |
| 10,965,516 B2 | 3/2021 | Fenoglio et al. |
| 11,336,506 B1 | 5/2022 | Li et al. |

(Continued)

FOREIGN PATENT DOCUMENTS

| | | |
|---|---|---|
| WO | WO-2015027289 A1 | 3/2015 |
| WO | WO-2019168323 A1 | 9/2019 |
| WO | WO-2021251062 A1 | 12/2021 |

OTHER PUBLICATIONS

A Hierarchical Deep Temporal Model for Group Activity Recognition. Latapie et al. (Year: 2016).*

(Continued)

*Primary Examiner* — Delomia L Gilliard
(74) *Attorney, Agent, or Firm* — Lee & Hayes, P.C.

(57) ABSTRACT

In one embodiment, a device represents each of a plurality of objects depicted in video data over time as a set of timeseries of key points associated with that object. The device forms groups of objects based on their associated sets of timeseries. The device identifies an anomalous behavior of a particular group from among the groups of objects, based on their constituent timeseries of coordinate points. The device provides an alert regarding the anomalous behavior to a user interface for review.

20 Claims, 9 Drawing Sheets

(56) References Cited

U.S. PATENT DOCUMENTS

| | | | |
|---|---|---|---|
| 2005/0180603 | A1 | 8/2005 | Zoghlami et al. |
| 2008/0069482 | A1 | 3/2008 | Komiya |
| 2010/0322516 | A1 | 12/2010 | Xu et al. |
| 2011/0051992 | A1 | 3/2011 | Cobb et al. |
| 2012/0063641 | A1 | 3/2012 | Venkatesh et al. |
| 2013/0174116 | A1 | 7/2013 | Pfeifer |
| 2013/0191357 | A1 | 7/2013 | Hanis et al. |
| 2015/0186779 | A1 | 7/2015 | Deng et al. |
| 2016/0105617 | A1 | 4/2016 | Kirkby et al. |
| 2016/0328613 | A1 | 11/2016 | Gaidon et al. |
| 2016/0364377 | A1 | 12/2016 | Krishnamurthy |
| 2018/0033024 | A1* | 2/2018 | Latapie .................. G06V 20/53 |
| 2018/0367551 | A1* | 12/2018 | Muddu ............. G06F 16/24578 |
| 2019/0251366 | A1* | 8/2019 | Zhong .................... G06N 3/045 |
| 2019/0325259 | A1 | 10/2019 | Murphy |
| 2019/0377824 | A1 | 12/2019 | Wang et al. |
| 2020/0251091 | A1 | 8/2020 | Zhao |
| 2020/0319715 | A1 | 10/2020 | Holz |
| 2020/0334008 | A1 | 10/2020 | Spector et al. |
| 2020/0334273 | A1* | 10/2020 | Ashikhmin ............. G06F 9/451 |
| 2020/0349390 | A1 | 11/2020 | Konwar et al. |
| 2021/0042532 | A1 | 2/2021 | Latapie et al. |
| 2021/0174155 | A1 | 6/2021 | Smith et al. |
| 2021/0225409 | A1 | 7/2021 | Lawlor |
| 2021/0258652 | A1 | 8/2021 | Li et al. |
| 2021/0279615 | A1 | 9/2021 | Latapie et al. |
| 2021/0312773 | A1 | 10/2021 | Debnath et al. |
| 2021/0390423 | A1 | 12/2021 | Latapie et al. |
| 2021/0397849 | A1 | 12/2021 | Lin et al. |
| 2022/0138509 | A1 | 5/2022 | Crosby et al. |
| 2022/0156520 | A1 | 5/2022 | Brower |
| 2022/0157054 | A1 | 5/2022 | Lin et al. |
| 2023/0069074 | A1* | 3/2023 | Chen ................... G06F 11/3409 |
| 2023/0102786 | A1* | 3/2023 | Garapati ................ G06N 20/20 706/50 |

OTHER PUBLICATIONS

Agrawal, et al., "VQA: Visual Question Answering", Proceedings of the IEEE International Conference on Computer Vision (ICCV), 2015, 25 pages, arXiv:1505.00468v7 [cs.CL].

Ahmed, et al., "Reflection Detection in Image Sequences", CVPR 2011, Jun.-Jul. 2011, 9 pages, IEEE, Colorado Springs, CO.

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Arróspide, et al., "Homography-based ground plane detection using a single on-board camera", IET Intelligent Transport Systems 4(2), Jul. 2010, 149-160, IEEE.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, in Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

"D2.5 Profiling, Analytics and Privacy Methodological Foundations, Release II", Child Rescue, Collective Awareness Platform for Missing Children Investigation and Rescue, version 1, Jan. 2020, Horizon 2020 Programme of the European Union.

D'Amour, et al., "Underspecification Presents Challenges for Credibility in Modern Machine Learning", Underspecification in Machine Learning, online: https://arxiv.org/pdf/2011.03395.pdf, Nov. 2020, 59 pages.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, the Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Jacob, et al., "A Demonstration of the Exathlon Benchmarking Platform for Explainable Anomaly Detection", Proceedings of the VLDB Endowment (PVLDB), Oct. 2021, 5 pages, HAL Open Science.

Jawed, et al., "Self-Supervised Learning for Semi-Supervised Time Series Classification", Pacific-Asia Conference on Knowledge Discovery and Data Mining, PAKDD 2020: Advances in Knowledge Discovery and Data Mining, May 2020, pp. 499-511, Lecture Notes in Computer Science, vol. 12084.

Johnson, Mark, "The Body in The Mind", 1987, 268 pages, the University of Chicago Press.

Jordan, Jeremy, "An Overview of Semantic Image Segmentation", online: https://www.jeremyjordan.me/semantic-segmentation/, May 21, 2018, 20 pages.

Kiryati, et al., "A probabilistic Hough transform", Pattern Recognition. 24(4), 1991, pp. 303-316, the Pattern Recognition Society.

(56) References Cited

OTHER PUBLICATIONS

Korzybski, Alfred, "Manhood of Humanity, the Science and Art of Human Engineering", 1921, 240 pages, E. P. Dutton & Company, New York, NY.
Korzybski, Alfred, "Science and Sanity: An Introduction to Non-Aristotelian Systems and General Semantics", 5th Edition, 1994, 910 pages, Institute of General Semantics, New York, NY.
Korzybski, Alfred, "Videos—This Is Not That", online: https://www.thisisnotthat.com/korzybski-videos/, accessed Nov. 18, 2021, 7 pages.
Lakoff, G., "Women, Fire, and Dangerous Things", 1984, 631 pages, University of Chicago Press.
Latapie, et al., "A Metamodel and Framework for Artificial General Intelligence from Theory to Practice", Journal of Artificial Intelligence and Consciousness, Feb. 12, 2021, 1:30, 24 pages, World Scientific Publishing Company.
Li, et al., "Concept learning via granular computing: A cognitive viewpoint", Information Sciences 298 (2015), Published Dec. 2014, pp. 447-467, Elsevier Inc.
Li, et al., "Self-supervised Social Relation Representation for Human Group Detection", European Conference on Computer Vision (ECCV 2022, Oral), 17 pages.
Lin, et al., "Progressive Mirror Detection", 2020 IEEE/CVF Conference on Computer Vision and Pattern Recognition (CVPR), Jun. 2020, 9 pages, IEEE, Seattle, WA.
Ma, et al., "Granular computing and Dual Galois Connection", Information Sciences, 177(23), 2007, pp. 5365-5377, Elsevier Inc.
MacAulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Nauman, et al., "Identification of Anomalous Behavioral Patterns in Crowd Scenes", Computers, Materials & Continua, 71(1), Jan. 2022, pp. 925-939.
Park, et al., "Identifying Reflected Images from Object Detector in Indoor Environment Utilizing Depth Information", IEEE Robotics and Automation Letters, vol. 6, No. 2, Apr. 2021, pp. 635-642, IEEE.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Rao, et al., "Detection of Anomalous Crowd Behaviour Using Hyperspherical Clustering", "Detection of Anomalous Crowd Behaviour Using Hyperspherical Clustering", Nov. 2014, IEEE, Wollongong, NSW, Australia.
Sanchez, et al., "Revisiting crowd behaviour analysis through deep learning: Taxonomy, anomaly detection, crowd emotions, datasets, opportunities and prospects", Inf Fusion, 97, (2020), Published online Jul. 29, 2020, pp. 318-335, Elsevier B.V.
Scarselli, et al., "The Graph Neural Network Model", IEEE Transactions on Neural Networks (vol. 20, Issue: 1, Jan. 2009), pp. 61-80, IEEE.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, the U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "CODAM: A neural network model of consciousness", Neural Networks 20 (2007), pp. 983-992, Elsevier Ltd.
Thorisson, et al., "Cumulative Learning", Artificial General Intelligence—12th International Conference, AGI 2019, Proceedings, pp. 198-208, Springer.
Thorisson, Kristinn R., "A New Constructivist AI: From Manual Methods to Self-Constructive Systems", Chapter 9, Apr. 2012, pp. 147-174, Atlantis Press Book.
Thorisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Tripathy, et al., "Explaining Anomalies in Industrial Multivariate Time-Series Data with the Help of explainable AI", 2022 IEEE International Conference on Big Data and Smart Computing (BigComp), Jan. 2022, 8 pages, IEEE, Republic of Korea.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, et al. "Self in NARS, an AGI System", vol. 5, Article 20, Mar. 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Hierarchies of Concepts", I. Rival (Ed.), Ordered Sets, 1982, pp. 314-339.
Xue, et al., "Real-Time Anomaly Detection and Feature Analysis Based on Time Series for Surveillance Video", IEEE 5th International Conference on Universal Village • UV2020 • Session 3ABD-7, Oct. 2020, 7 pages, IEEE, Boston, MA.
Yang, et al., "Semi-automatic Image and Video Annotation System for Generating Ground Truth Information", 2018 International Conference on Information Networking (ICOIN), Jan. 2018, pp. 821-824, IEEE, Chiang Mai, Thailand.
Yao, et al., "A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.

(56) References Cited

OTHER PUBLICATIONS pdf, in KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

BEHAVIORAL GROUP ANALYTICS FOR VIDEO

TECHNICAL FIELD

The present disclosure relates generally to computer networks, and, more particularly, to behavioral group analytics for video.

BACKGROUND

With the advents of machine and deep learning, video analytics systems have grown in both their capabilities, as well as their complexities. One use for such systems exists in the context of multi-camera surveillance systems, to detect people and other objects and make decisions about their behaviors. For instance, a surveillance system in an airport or other sensitive area may seek to detect when a person leaves an object unattended.

One of the more interesting areas of video analytics relates to the analysis of how different groups of people or other objects behave. For instance, consider the case of a family walking through a public place. A change in the dynamics of the group, such as when a child separates from the group, could indicate a situation in which the child becomes lost or kidnapped. Automatic detection of such events could aid in the quick dispatch of personnel, to address the situation. However, despite recent advances in machine and deep learning, identifying different groups within video, as well as analyzing their behaviors, remains challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
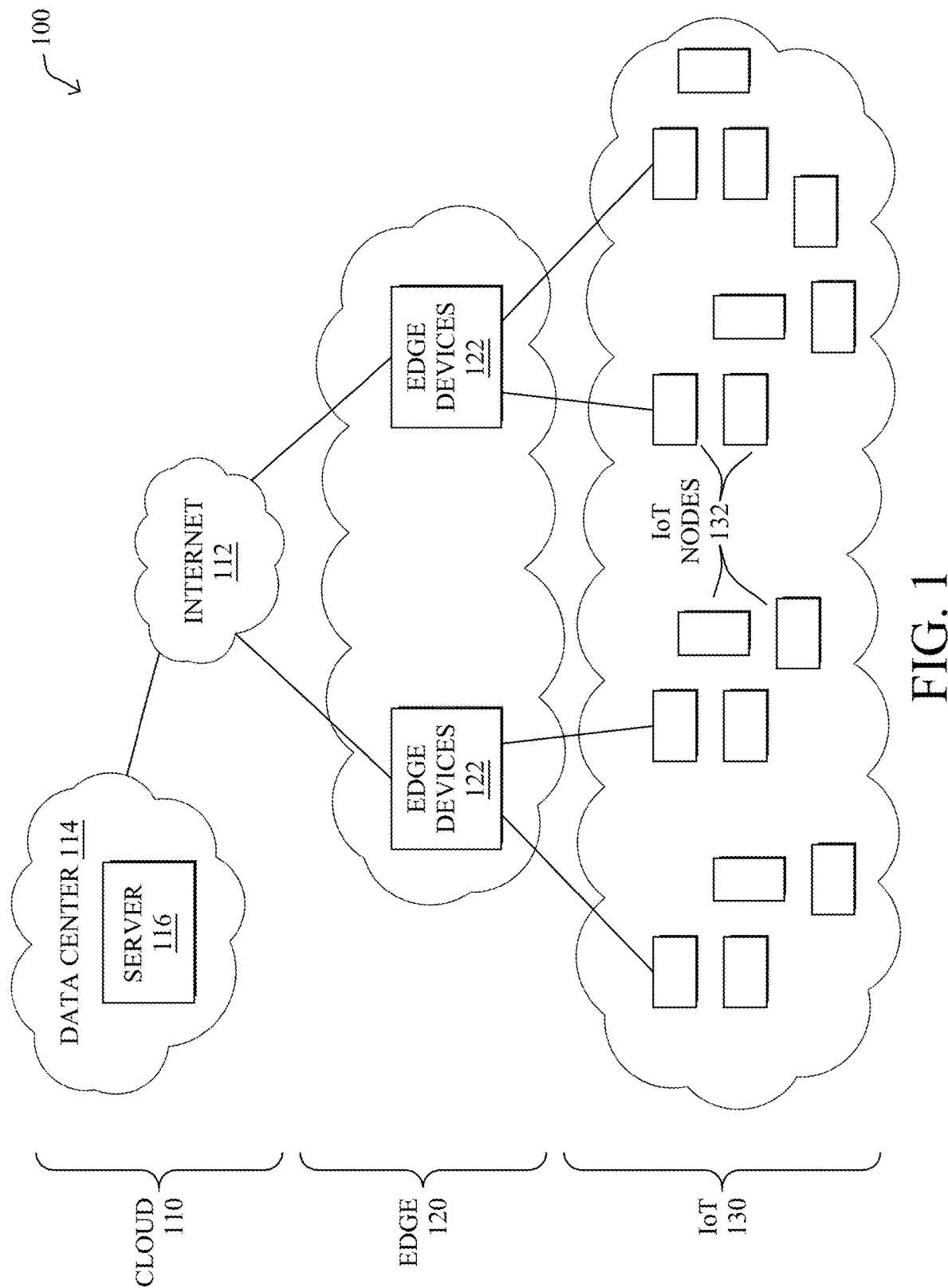
FIG. 1 illustrate an example network.

According to one or more embodiments of the disclosure, a device represents each of a plurality of objects depicted in video data over time as a set of timeseries of key points associated with that object. The device forms groups of objects based on their associated sets of timeseries. The device identifies an anomalous behavior of a particular group from among the groups of objects, based on their constituent timeseries of coordinate points. The device provides an alert regarding the anomalous behavior to a user interface for review.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc..), or other shared-media protocols where appropriate. In this context, a protocol consists of a set of rules defining how the nodes interact with each other.

Figure 2:
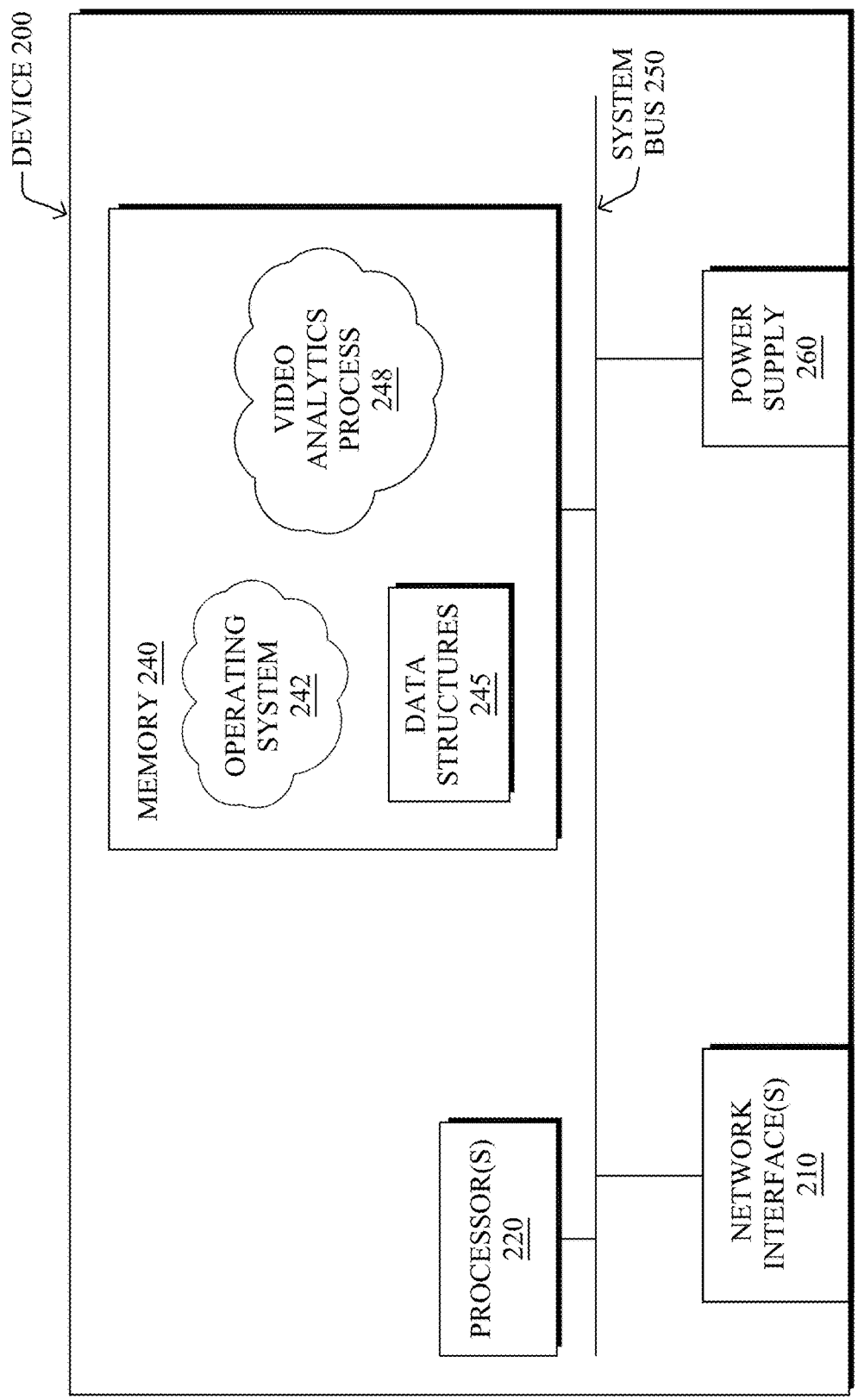
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative video analytics process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, video analytics process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
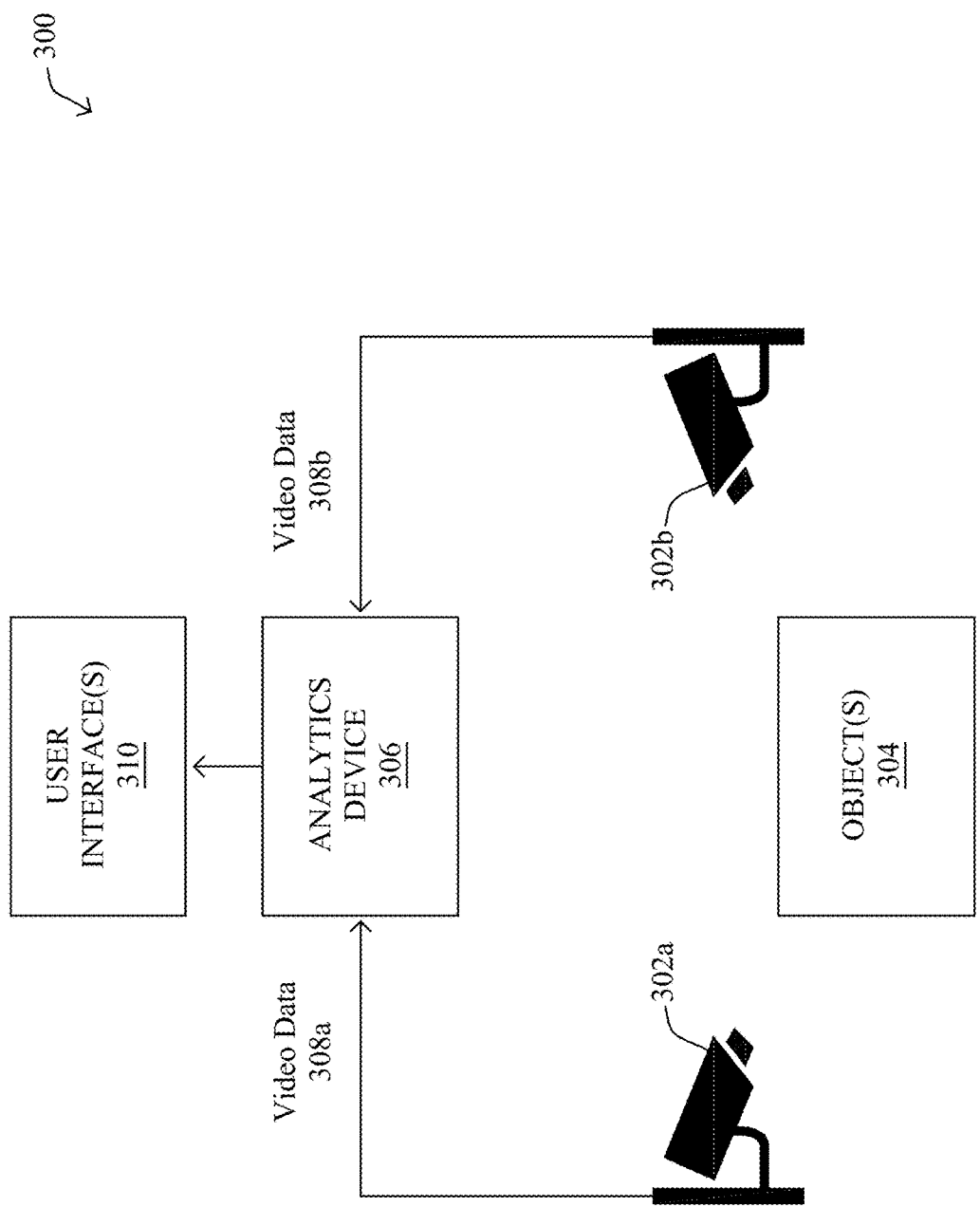
FIG. 3 illustrates an example system for performing video analytics.

FIG. 3 illustrates an example system 300 for performing video analytics, as described in greater detail above. As shown, there may be any number of cameras 302 deployed to a physical area, such as cameras 302*a*-302*b*. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302*a*-302*b* may generate and send video data 308*a*-308*b*, respectively, to an analytics device 306 (e.g., a device 200 executing video analytics process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308*a*-308*b* for display to one or more user interfaces 310, as well as to analyze the video data for events that may be of interest to a potential user. To this end, analytics device 306 may perform object detection on video data 308*a*-308*b*, to detect and track any number of objects 304 present in the physical area and depicted in the video data 308*a*-308*b*. In some embodiments, analytics device 306 may also perform object re-identification on video data 308*a*-308*b*, allowing it to recognize an object 304 in video data 308*a* as being the same object in video data 308*b* or vice-versa.

As noted above, with the advents of machine and deep learning, video analytics systems have grown in both their capabilities, as well as their complexities. One use for such systems exists in the context of multi-camera surveillance systems, to detect people and other objects and make decisions about their behaviors. For instance, a surveillance system in an airport or other sensitive area may seek to detect when a person leaves an object unattended.

One of the more interesting areas of video analytics relates to the analysis of how different groups of people or other objects behave. For instance, consider the case of a family walking through a public place. A change in the dynamics of the group, such as when a child separates from the group, could indicate a situation in which the child becomes lost or kidnapped. Automatic detection of such events could aid in the quick dispatch of personnel, to address the situation. However, despite recent advances in machine and deep learning, identifying different groups within video, as well as analyzing their behaviors, remains challenging.

--Behavioral Group Analytics for Video--

The techniques herein introduce timeseries-based analysis of video for purposes of identifying different groups of people or other objects and evaluating their interactions and behaviors. In some aspects, the analytics system may raise alerts when anomalous behavior is detected, such as when one group is behaving anomalously with respect to one or more other groups, based on the interactions between groups, or the like. Further aspects of the techniques herein propose leveraging self-supervised learning for purposes of detecting such anomalies, as well as to provide labels for the different groups (e.g., labeling them by their types, behaviors, etc.).

Illustratively, the techniques described herein may be performed by hardware, software, and/or firmware, such as in accordance with the video analytics process 248, which may include computer executable instructions executed by the processor 220 (or independent processor of interfaces 210), to perform functions relating to the techniques described herein.

Specifically, according to various embodiments, a device represents each of a plurality of objects depicted in video data over time as a set of timeseries of key points associated with that object. The device forms groups of objects based on their associated sets of timeseries. The device identifies an anomalous behavior of a particular group from among the groups of objects, based on their constituent timeseries of coordinate points. The device provides an alert regarding the anomalous behavior to a user interface for review.

Operationally, in various embodiments, a key observation herein is that each individual object depicted in video data can be represented as a set of timeseries of its constituent key points. In general, the key points of an object are the one or more coordinate points of the object that may be interconnected and represent the overall shape or kinematics of the object at any given time. Thus, when the depicted object moves, its key points will also change, accordingly, allowing for the object to be represented as a set of timeseries of its key points, which capture the dynamics of the object. In addition, the characteristics of these timeseries, such as their frequencies, amplitudes, etc., essentially form a 'fingerprint' for the object, allowing the system to distinguish between different objects, even across different video streams.

Figure 4A:
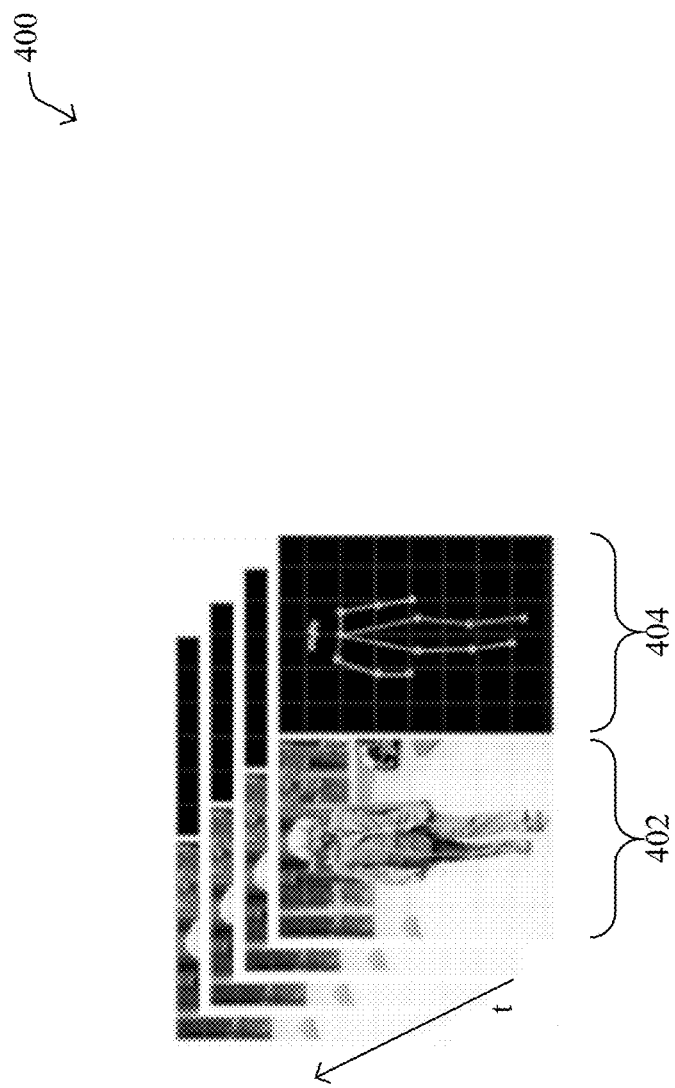
FIGS. 4A-4B illustrates an example of converting video data depicting an object over time into a set of key points and representing those sets as timeseries.
Figure 4B:
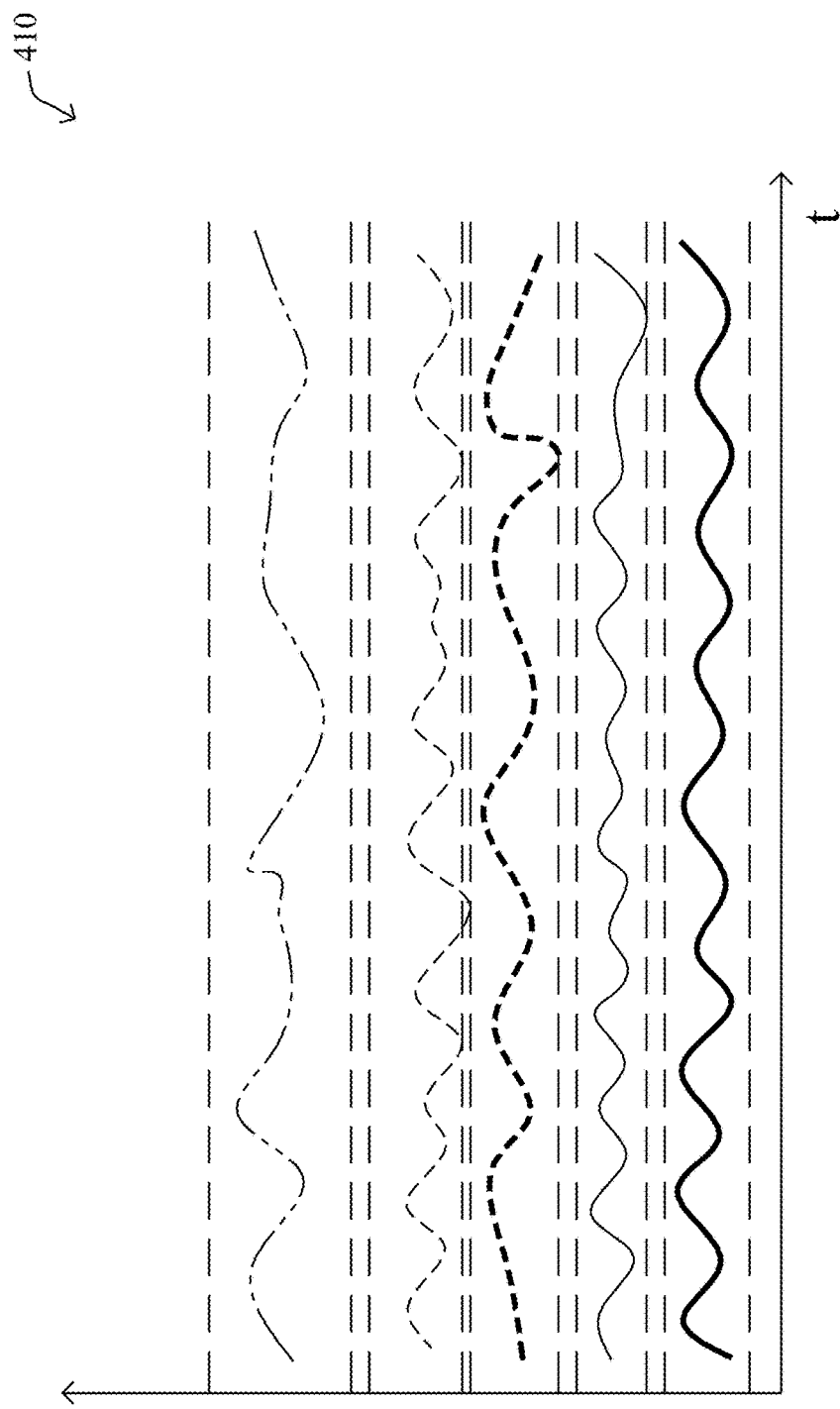

By way of example, FIGS. 4A-4B illustrates an example of converting video data depicting an object over time into a set of key points and representing those sets as timeseries. More specifically, FIG. 4A illustrates the extraction 400 of key points from video data 402 captured over time. As shown, assume that video data 402 depicts a person walking and comprises a series of images captured over time.

In various embodiments, video analytics process 248 may employ pose estimation to the person in each image in video data 402, to extract out a corresponding set of key points 404 that represent the dynamics of the person. As would be appreciated, pose estimation generally seeks to model the pose/shape of a depicted person as a set of interconnected key points. For instance, the key points of the depicted person may be associated with different body parts of the person, such as different parts of their limbs, torso, neck, head, etc.

In some instances, each key point may present a joint or other point of articulation on the human body, allowing the connections between the key points to represent the different structures connected to these points of articulation. For example, one key point may represent the left knee of the person and have two connections: a first connection to another key point that represents the left hip of the person and a second connection that represents the left ankle of the person. Thus, the first connection will effectively represent the left thigh of the person and the second connection will effectively represent their left shin. Of course, the number of key points used for any given type of object may also be varied, as desired, as well.

As would be appreciated, different object may have different kinematic models that can be used to extract their key points from the captured video data. To this end, video analytics process 248 may perform an initial classification of any detected object, to select an appropriate model for its analysis. For instance, in the case of video data 402, video analytics process 248 may determine that video data 402 depicts a person and apply a human pose estimation model to it, to extract out the set of key points 404 for each analyzed frame.

As shown in FIG. 4B, video analytics process 248 may then convert the extracted sets of key points for a detected object into a set of timeseries 410. For any given key point, its corresponding timeseries may represent its change in coordinates over time, its location relative to one or more other key points, its spatial movement over time (e.g., its velocity, its direction of motion, etc.), combinations thereof, or the like. In various embodiments, video analytics process 248 may use the set of timeseries 410 as a fingerprint for the person depicted in video data 402. Indeed, the characteristics of the timeseries (e.g., their amplitudes, frequencies, shapes, patterns, etc.) will vary from one object to another enough that video analytics process 248 can treat them as representations of the object. In turn, video analytics process 248 may use this information to distinguish that person or other object from others, (re-)identifying the person or other object across different video streams, and the like.

According to various embodiments, the above timeseries analysis can also be extended to groups of objects, even in a crowded area. To do so, in some embodiments, video analytics process 248 may employ self-supervised learning to label different groups of objects and/or label their behaviors. For instance, video analytics process 248 could group the data based on different levels of timeseries analysis and/or different metrics.

In some embodiments, video analytics process 248 may also consider perspective invariant metrics (e.g., when detecting the key points of an object and forming its timeseries), to help ensure that the video analytics will work with various camera angles, camera heights, distances to the cameras, etc. In addition, in one embodiment, video analytics process 248 may also leverage homology based ground plane detection. Doing so allows video analytics process 248 to identify planes within the video, such as walls, the floor, and the like, which may also aid in the identification of the perspective invariant metrics.

Figure 5:
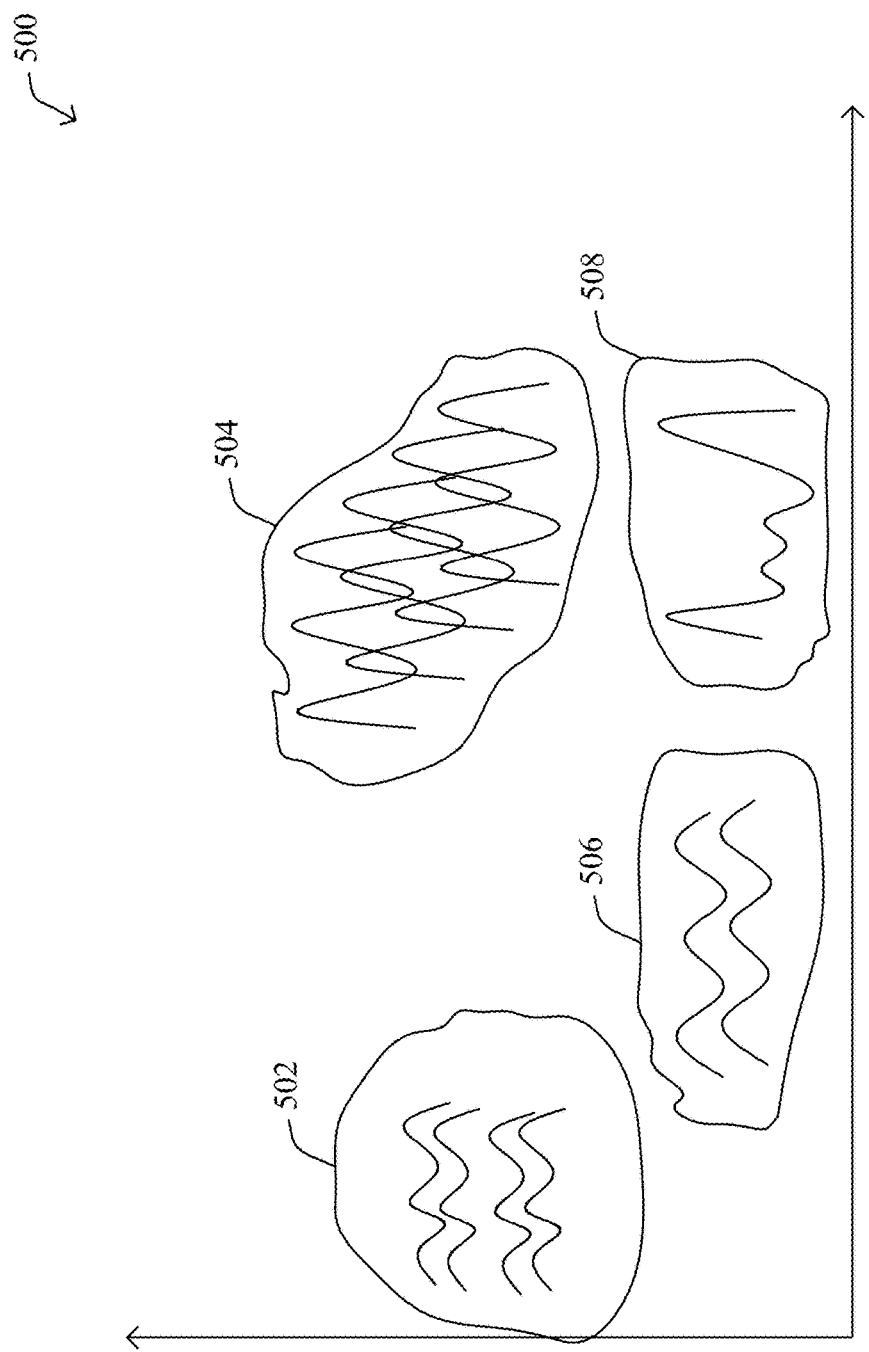
FIG. 5 illustrates an example of the formation of behavioral groups.

FIG. 5 illustrates an example 500 of the formation of behavioral groups, in various embodiments. As shown, assume that video analytics process 248 has applied the above timeseries analysis to video data depicting a plurality of different objects, such as people within a crowded area. As a result, each of the depicted people will have an associated set of timeseries of their key points.

Video analytics process 248 may then form behavioral groups, such as groups 502-508 shown, by identifying those sets of timeseries that are similar to one another. In one embodiment, video analytics process 248 may also impose a distance threshold between the objects, when forming such groups, to ensure that any such objects that are grouped together are within a certain distance of one another, as well.

The assumption here is that the objects in any given group will all behave somewhat similarly with respect to one another, while exhibiting some differences with respect to other groups. For instance, consider the case of a family walking through a mall. In such a case, the family members may all be walking at a similar cadence, in similar directions, etc., resulting in the movements of their key points all exhibiting similar patterns and similar timeseries. Conversely, a group of teenagers walking in the opposite direction may be moving at a much faster, erratic pace. Thus, by assessing the timeseries for the different people in the area, video analytics process 248 can identify different groups of them, according to their behaviors.

Figure 6:
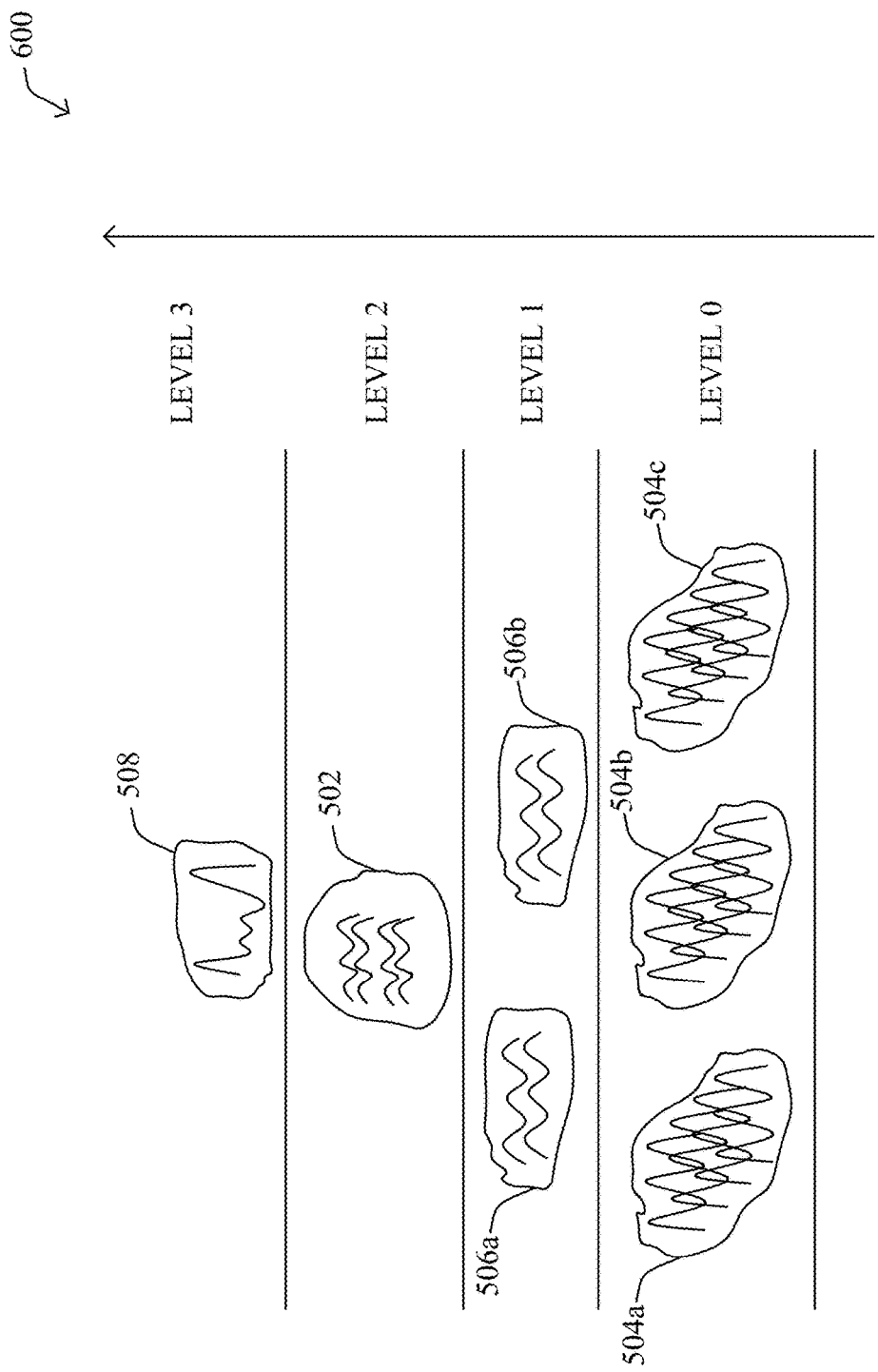
FIG. 6 illustrates an example of organizing behavioral groups into a hierarchy of behaviors.

In some embodiments, video analytics process 248 may also use self-supervised learning to evaluate the relationships of the different groups, hierarchically. For instance, as shown in FIG. 6, video analytics process 248 may assign a group to a level of a hierarchy 600 based on factors such as the number of other groups that are similar, the number of objects associated with that group, or the like.

Consider, for example, the four different types of groups 502-508 previously shown in FIG. 5. Now, assume that three different groups 504a-504c exhibit timeseries patterns similar to that of group 504 in FIG. 5. Accordingly, video analytics process 248 may assign groups 504a-504c to the lowest level of hierarchy 600, Level 0, as they represent the most common group pattern. Next, assume that two groups 506a-506b exhibit timeseries patterns similar to that of group 506 in FIG. 5. Since there are fewer groups that exhibit this type of behavior, video analytics process 248 may assign groups 506a-506b to Level 1 of hierarchy 600. Now, assume that only one group 502 was detected and only one group 508 was detected. Since group 502 has more constituent objects in it (e.g., people), video analytics process 248 may assign it to Level 2 of hierarchy 600 and group 508 to Level 3 of hierarchy 600.

In effect, hierarchy 600 may serve as a behavioral filter to help video analytics process 248 identify detected groups of interest within the video data. For instance, video analytics process 248 may deem the object(s) represented by group 508 as anomalous when compared to the other groups in hierarchy 600. In one embodiment, video analytics process 248 may utilize one or level thresholds with respect to hierarchy 600, to make such a determination (e.g., anything above Level 2 is considered anomalous, by its very nature).

In various embodiments, video analytics process 248 may also leverage self-supervised learning, to associate labels with the different group types. For instance, in the case of families walking through a mall (e.g., groups 504a-504c), video analytics process 248 may learn the label "families," which it could then use to provide context to a user regarding that group. Such labels could, for instance, denote the type(s) of objects in a certain group and/or its behavior(s) (e.g., "walking," "running," etc.). As would be appreciated, the specific label(s) for any given group may vary, depending on its object types and the like (e.g., a vehicle will not have a possible label of "walking").

Figure 7:
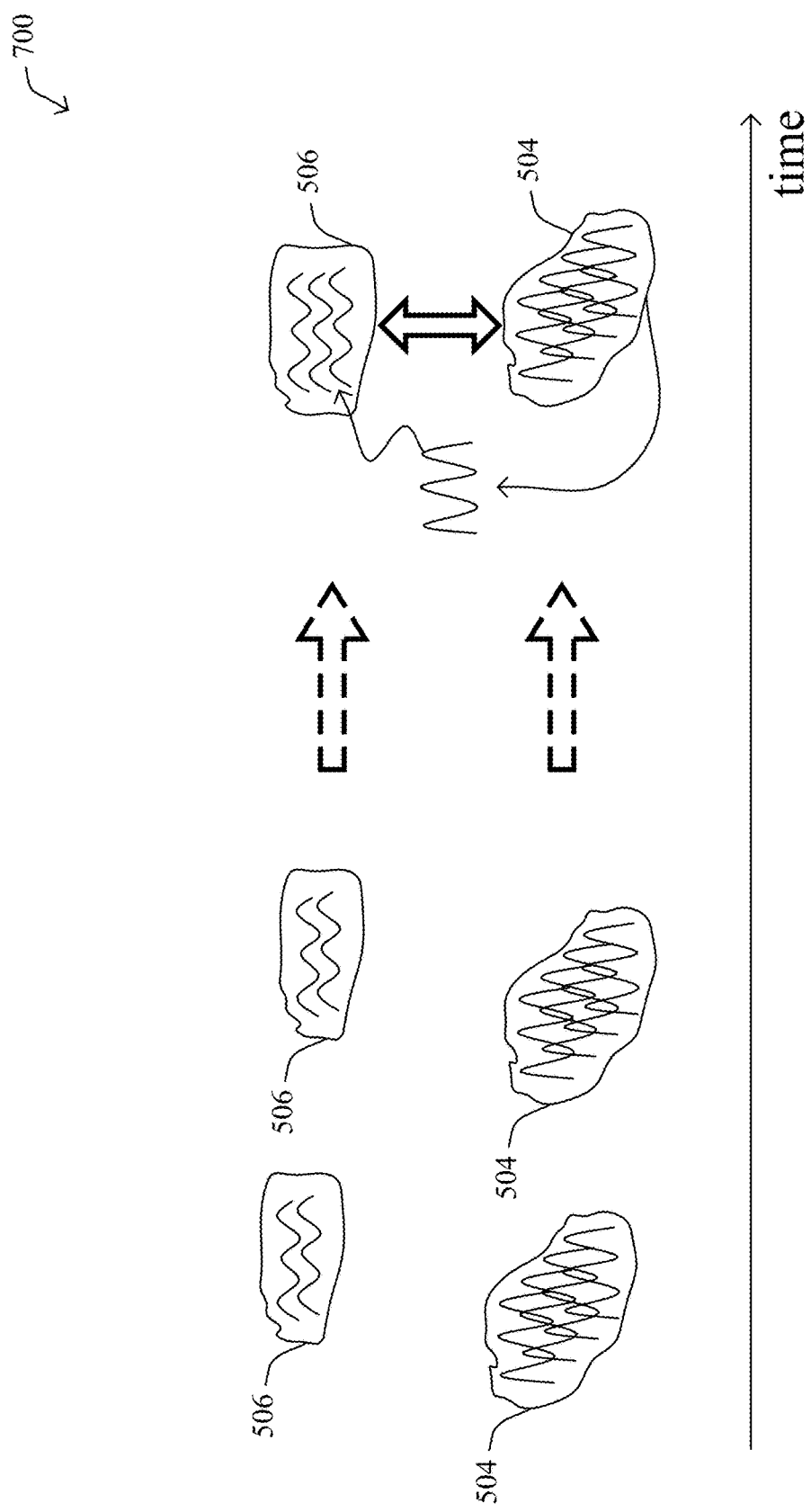
FIG. 7 illustrates an example of the detection of an anomaly among behavioral groups.

In various embodiments, video analytics process 248 may also determine that a particular group is anomalous, based on its interactions with one or more of the other groups. For instance, consider example 700 shown in FIG. 7. As shown, over the course of time, group 506 and group 504 may remain relatively unchanged until a point in time at which one of the constituent objects in 504 suddenly exhibits a change in its timeseries, thereby moving it from group 504 to becoming a member of group 506, instead. In such a case, video analytics process 248 may deem this anomalous. For instance, in the case of group 504 representing a family, this sudden change could mean that a potential kidnapping is taking place or a child in the family has suddenly become lost. In some embodiments, video analytics process 248 could also leverage self-supervised learning to apply a label to the different group interactions, in a similar manner to that of the group types and/or their behaviors.

When video analytics process 248 has detected an anomalous behavior of a group, it may generate and provide an alert to a user interface for presentation to a user interface for review. In some embodiments, the alert may be provided in conjunction with the captured video data. For instance, the alert may be presented as an overlay or annotation for the video data, to draw the attention of the user to the anomaly. In cases in which video analytics process 248 has also applied one or more labels to the anomalous group(s) and/or its behavior(s), the alert may also include the label(s), allowing the user to not only see the anomalous behavior, but also the context (e.g., "child moved from family group to group walking in opposite direction," etc.).

Figure 8:
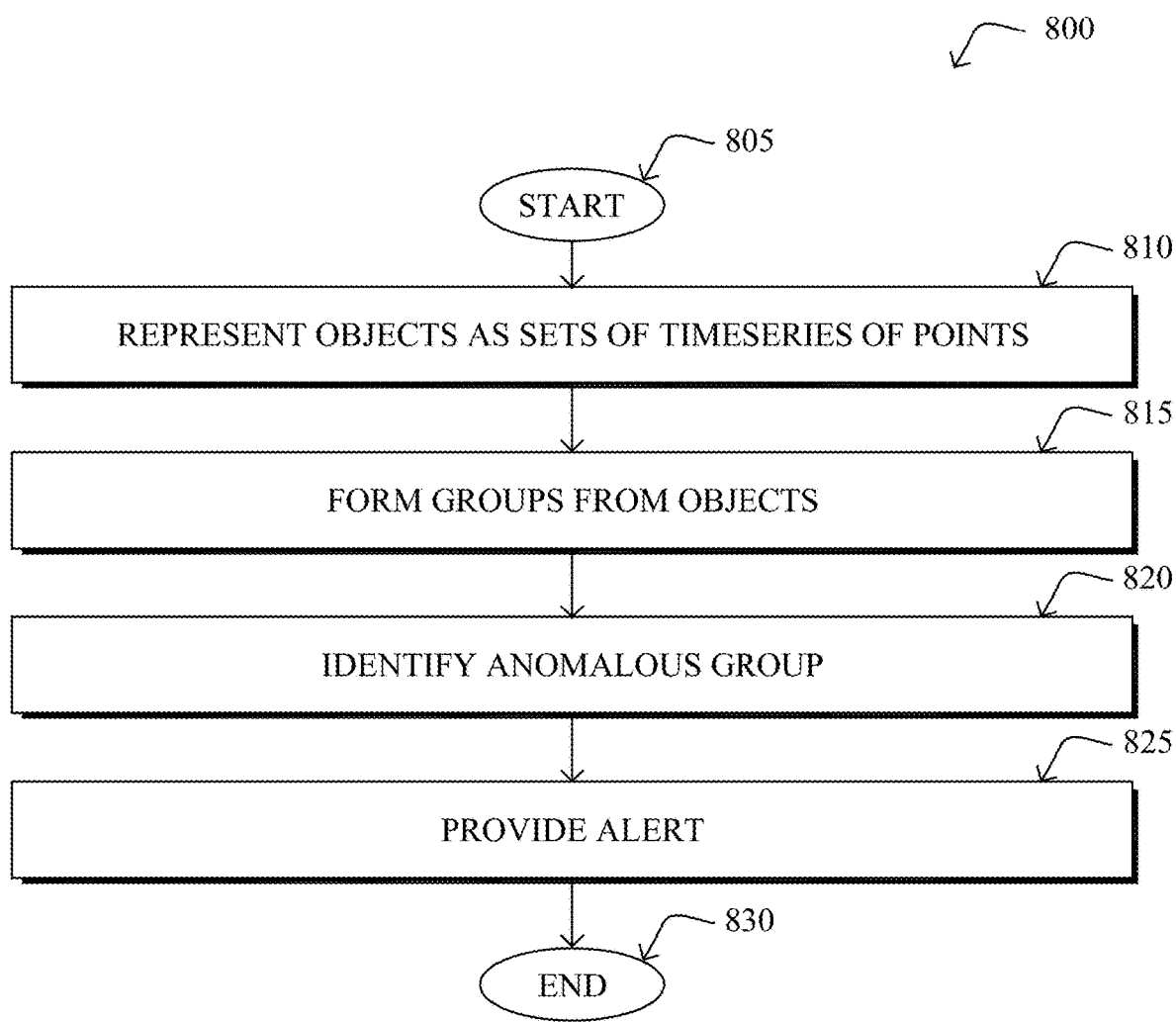
FIG. 8 illustrates an example simplified procedure for behavioral group analytics for video.

FIG. 8 illustrates an example simplified procedure 800 (e.g., a method) for behavioral group analytics for video, in accordance with one or more embodiments described herein. For example, a non-generic, specifically configured device (e.g., device 200), such as an edge device, a server, or other device in a network, may perform procedure 800 by executing stored instructions (e.g., video analytics process 248). The procedure 800 may start at step 805, and continues to step 810, where, as described in greater detail above, the device may represent each of a plurality of objects depicted in video data over time as a set of timeseries of key points associated with that object. In some embodiments, the device may detect the key points by applying a pose estimation model to the video data. In some embodiments, the plurality of objects comprise people detected in the video data.

At step 815, as detailed above, the device may form groups of objects, based on their associated sets of timeseries. In some embodiments, the groups of objects are formed based in part on frequencies or amplitudes of the set of timeseries. In further embodiments, the device may also use self-supervised learning to generate a label for the particular group. In another embodiment, the groups of objects are formed based in part on spatial distances between the plurality of objects.

At step 820, the device may identify an anomalous behavior of a particular group from among the groups of objects, based on their constituent timeseries of coordinate points, as described in greater detail above. In one embodiment, the device uses self-supervised learning to identify the anomalous behavior. In some embodiments, the anomalous behavior comprises a set of timeseries associated with a particular object in one group moving to another group. In further embodiments, the device may also detect the anomalous behavior in part by forming a hierarchy of the groups of objects whereby a level of the hierarchy comprises those of the groups of objects that have similar associated timeseries.

At step 825, as detailed above, the device may provide an alert regarding the anomalous behavior to a user interface for review. In various embodiments, such an alert may include a label for the particular group, any of the other groups, and/or the anomalous behavior, thereby allowing a reviewer to quickly assess the situation from the video data. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for behavioral group analytics for video, it is to be understood that various other adaptations and modifications may be made within the spirit and scope of the embodiments herein. For example, while certain embodiments are described herein with respect to specific use cases for the techniques herein, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof, that cause a device to perform the techniques herein. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   representing, by a device, each of a plurality of objects depicted in video data over time as a set of timeseries of key points associated with that object;
   forming, by the device, groups of objects by analyzing sets of timeseries of key points associate each object that are similar to one another;
   identifying, by the device, an anomalous behavior of a particular group from among the groups of objects, based on their constituent timeseries of coordinate points and when compared to other groups; and
   providing, by the device, an alert regarding the anomalous behavior to a user interface for review.

2. The method as in claim 1, further comprising:
   detecting the key points by applying a pose estimation model to the video data.

3. The method as in claim 1, wherein the plurality of objects comprise people detected in the video data.

4. The method as in claim 1, wherein the groups of objects are formed based in part on frequencies or amplitudes of the set of timeseries.

5. The method as in claim 1, wherein the device uses self-supervised learning to identify the anomalous behavior.

6. The method as in claim 1, wherein the anomalous behavior comprises a set of timeseries associated with a particular object in one group moving to another group.

7. The method as in claim 1, further comprising:
   using self-supervised learning to generate a label for the particular group, wherein the alert includes the label.

8. The method as in claim 1, wherein identifying the anomalous behavior comprises:
   forming a hierarchy of the groups of objects whereby a level of the hierarchy comprises those of the groups of objects that have similar associated timeseries.

9. The method as in claim 1, wherein the groups of objects are formed based in part on spatial distances between the plurality of objects.

10. The method as in claim 1, wherein the device is an edge device in a network.

11. An apparatus, comprising:
    a network interface to communicate with a computer network;
    a processor coupled to the network interface and configured to execute one or more processes; and
    a memory configured to store a process that is executed by the processor, the process when executed configured to:
      represent each of a plurality of objects depicted in video data over time as a set of timeseries of key points associated with that object;
      form groups of objects by analyzing sets of timeseries of key points associated with each object that are similar to one another;
      identify an anomalous behavior of a particular group from among the groups of objects, based on their constituent timeseries of coordinate points and when compared to other groups; and
      provide an alert regarding the anomalous behavior to a user interface for review.

12. The apparatus as in claim 11, wherein the process when executed is further configured to:
    detect the key points by applying a pose estimation model to the video data.

13. The apparatus as in claim 11, wherein the plurality of objects comprise people detected in the video data.

14. The apparatus as in claim 11, wherein the groups of objects are formed based in part on frequencies or amplitudes of the set of timeseries.

15. The apparatus as in claim 11, wherein the apparatus uses self-supervised learning to identify the anomalous behavior.

16. The apparatus as in claim 11, wherein the anomalous behavior comprises a set of timeseries associated with a particular object in one group moving to another group.

17. The apparatus as in claim 11, wherein the process when executed is further configured to:
    use self-supervised learning to generate a label for the particular group, wherein the alert includes the label.

18. The apparatus as in claim 11, wherein the apparatus identifies the anomalous behavior by:
    forming a hierarchy of the groups of objects whereby a level of the hierarchy comprises those of the groups of objects that have similar associated timeseries.

19. The apparatus as in claim 11, wherein the groups of objects are formed based in part on spatial distances between the plurality of objects.

20. A tangible, non-transitory, computer-readable medium storing program instructions that cause a device to execute a process comprising:
    representing, by the device, each of a plurality of objects depicted in video data over time as a set of timeseries of key points associated with that object;
    forming, by the device, groups of objects by analyzing sets of timeseries of key points associated with each object that are similar to one another;
    identifying, by the device, an anomalous behavior of a particular group from among the groups of objects, based on their constituent timeseries of coordinate points and when compared to other groups; and
    providing, by the device, an alert regarding the anomalous behavior to a user interface for review.

* * * * *